United States Patent
Miller et al.

(10) Patent No.: US 11,872,626 B2
(45) Date of Patent: Jan. 16, 2024

(54) SYSTEMS AND METHODS FOR FLOATING PIN JOINT DESIGN

(71) Applicant: Divergent Technologies, Inc., Los Angeles, CA (US)

(72) Inventors: Samuel Noah Miller, Marina Del Rey, CA (US); Matthew Cooper Keller, Marina Del Rey, CA (US); Eric Paul Monteith, Long Beach, CA (US); Thomas Samuel Bowden, Jr., Los Angeles, CA (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 8 days.

(21) Appl. No.: 17/520,543

(22) Filed: Nov. 5, 2021

(65) Prior Publication Data
US 2022/0203452 A1    Jun. 30, 2022

Related U.S. Application Data

(60) Provisional application No. 63/130,487, filed on Dec. 24, 2020.

(51) Int. Cl.
*B33Y 10/00* (2015.01)
*B33Y 80/00* (2015.01)
*B22F 10/40* (2021.01)
*B22F 10/28* (2021.01)

(52) U.S. Cl.
CPC .............. *B22F 10/40* (2021.01); *B22F 10/28* (2021.01); *B33Y 10/00* (2014.12); *B33Y 80/00* (2014.12)

(58) Field of Classification Search
None
See application file for complete search history.

(56) References Cited

U.S. PATENT DOCUMENTS

| | | | |
|---|---|---|---|
| 5,203,226 A | 4/1993 | Hongou et al. | |
| 5,742,385 A | 4/1998 | Champa | |
| 5,990,444 A | 11/1999 | Costin | |
| 6,010,155 A | 1/2000 | Rinehart | |

(Continued)

FOREIGN PATENT DOCUMENTS

| WO | 1996036455 A1 | 11/1996 |
|---|---|---|
| WO | 1996036525 A1 | 11/1996 |

(Continued)

OTHER PUBLICATIONS

US 9,202,136 B2, 12/2015, Schmidt et al. (withdrawn)

(Continued)

*Primary Examiner* — Elizabeth Collister
(74) *Attorney, Agent, or Firm* — ARENTFOX SCHIFF LLP

(57) ABSTRACT

Techniques for joining nodes and subcomponents are presented herein. An apparatus in accordance with an aspect of the present disclosure comprises a 3-D printed first part having an interconnect co-printed with the first part such that the interconnect of the first part can float within the first part, and a 3-D printed second part having an interconnect co-printed with the second part such that the interconnect of the second part can float within the second part, wherein the interconnects of the first and second parts are configured to form a connection between the first and second parts.

8 Claims, 11 Drawing Sheets

(56) References Cited

U.S. PATENT DOCUMENTS

| | | |
|---|---|---|
| 6,096,249 A | 8/2000 | Yamaguchi |
| 6,140,602 A | 10/2000 | Costin |
| 6,250,533 B1 | 6/2001 | Otterbein et al. |
| 6,252,196 B1 | 6/2001 | Costin et al. |
| 6,318,642 B1 | 11/2001 | Goenka et al. |
| 6,365,057 B1 | 4/2002 | Whitehurst et al. |
| 6,391,251 B1 | 5/2002 | Keicher et al. |
| 6,409,930 B1 | 6/2002 | Whitehurst et al. |
| 6,468,439 B1 | 10/2002 | Whitehurst et al. |
| 6,554,345 B2 | 4/2003 | Jonsson |
| 6,585,151 B1 | 7/2003 | Ghosh |
| 6,644,721 B1 | 11/2003 | Miskech et al. |
| 6,811,744 B2 | 11/2004 | Keicher et al. |
| 6,866,497 B2 | 3/2005 | Saiki |
| 6,919,035 B1 | 7/2005 | Clough |
| 6,926,970 B2 | 8/2005 | James et al. |
| 7,152,292 B2 | 12/2006 | Hohmann et al. |
| 7,344,186 B1 | 3/2008 | Hausler et al. |
| 7,500,373 B2 | 3/2009 | Quell |
| 7,586,062 B2 | 9/2009 | Heberer |
| 7,637,134 B2 | 12/2009 | Burzlaff et al. |
| 7,710,347 B2 | 5/2010 | Gentilman et al. |
| 7,716,802 B2 | 5/2010 | Stem et al. |
| 7,745,293 B2 | 6/2010 | Yamazaki et al. |
| 7,766,123 B2 | 8/2010 | Sakurai et al. |
| 7,852,388 B2 | 12/2010 | Shimizu et al. |
| 7,908,922 B2 | 3/2011 | Zarabadi et al. |
| 7,951,324 B2 | 5/2011 | Naruse et al. |
| 8,094,036 B2 | 1/2012 | Heberer |
| 8,163,077 B2 | 4/2012 | Eron et al. |
| 8,286,236 B2 | 10/2012 | Jung et al. |
| 8,289,352 B2 | 10/2012 | Vartanian et al. |
| 8,297,096 B2 | 10/2012 | Mizumura et al. |
| 8,354,170 B1 | 1/2013 | Henry et al. |
| 8,383,028 B2 | 2/2013 | Lyons |
| 8,408,036 B2 | 4/2013 | Reith et al. |
| 8,429,754 B2 | 4/2013 | Jung et al. |
| 8,437,513 B1 | 5/2013 | Derakhshani et al. |
| 8,444,903 B2 | 5/2013 | Lyons et al. |
| 8,452,073 B2 | 5/2013 | Taminger et al. |
| 8,599,301 B2 | 12/2013 | Dowski, Jr. et al. |
| 8,606,540 B2 | 12/2013 | Haisty et al. |
| 8,610,761 B2 | 12/2013 | Haisty et al. |
| 8,631,996 B2 | 1/2014 | Quell et al. |
| 8,675,925 B2 | 3/2014 | Derakhshani et al. |
| 8,678,060 B2 | 3/2014 | Dietz et al. |
| 8,686,314 B2 | 4/2014 | Schneegans et al. |
| 8,686,997 B2 | 4/2014 | Radet et al. |
| 8,694,284 B2 | 4/2014 | Berard |
| 8,720,876 B2 | 5/2014 | Reith et al. |
| 8,752,166 B2 | 6/2014 | Jung et al. |
| 8,755,923 B2 | 6/2014 | Farahani et al. |
| 8,787,628 B1 | 7/2014 | Derakhshani et al. |
| 8,818,771 B2 | 8/2014 | Gielis et al. |
| 8,873,238 B2 | 10/2014 | Wilkins |
| 8,978,535 B2 | 3/2015 | Ortiz et al. |
| 9,006,605 B2 | 4/2015 | Schneegans et al. |
| 9,071,436 B2 | 6/2015 | Jung et al. |
| 9,101,979 B2 | 8/2015 | Hofmann et al. |
| 9,104,921 B2 | 8/2015 | Derakhshani et al. |
| 9,126,365 B1 | 9/2015 | Mark et al. |
| 9,128,476 B2 | 9/2015 | Jung et al. |
| 9,138,924 B2 | 9/2015 | Yen |
| 9,149,988 B2 | 10/2015 | Mark et al. |
| 9,156,205 B2 | 10/2015 | Mark et al. |
| 9,186,848 B2 | 11/2015 | Mark et al. |
| 9,244,986 B2 | 1/2016 | Karmarkar |
| 9,248,611 B2 | 2/2016 | Divine et al. |
| 9,254,535 B2 | 2/2016 | Buller et al. |
| 9,266,566 B2 | 2/2016 | Kim |
| 9,269,022 B2 | 2/2016 | Rhoads et al. |
| 9,327,452 B2 | 5/2016 | Mark et al. |
| 9,329,020 B1 | 5/2016 | Napoletano |
| 9,332,251 B2 | 5/2016 | Haisty et al. |
| 9,346,127 B2 | 5/2016 | Buller et al. |
| 9,389,315 B2 | 7/2016 | Bruder et al. |
| 9,399,256 B2 | 7/2016 | Buller et al. |
| 9,403,235 B2 | 8/2016 | Buller et al. |
| 9,418,193 B2 | 8/2016 | Dowski, Jr. et al. |
| 9,457,514 B2 | 10/2016 | Schwarzler |
| 9,469,057 B2 | 10/2016 | Johnson et al. |
| 9,478,063 B2 | 10/2016 | Rhoads et al. |
| 9,481,402 B1 | 11/2016 | Muto et al. |
| 9,486,878 B2 | 11/2016 | Buller et al. |
| 9,486,960 B2 | 11/2016 | Paschkewitz et al. |
| 9,502,993 B2 | 11/2016 | Deng |
| 9,525,262 B2 | 12/2016 | Stuart et al. |
| 9,533,526 B1 | 1/2017 | Nevins |
| 9,555,315 B2 | 1/2017 | Aders |
| 9,555,580 B1 | 1/2017 | Dykstra et al. |
| 9,557,856 B2 | 1/2017 | Send et al. |
| 9,566,742 B2 | 2/2017 | Keating et al. |
| 9,566,758 B2 | 2/2017 | Cheung et al. |
| 9,573,193 B2 | 2/2017 | Buller et al. |
| 9,573,225 B2 | 2/2017 | Buller et al. |
| 9,586,290 B2 | 3/2017 | Buller et al. |
| 9,595,795 B2 | 3/2017 | Lane et al. |
| 9,597,843 B2 | 3/2017 | Stauffer et al. |
| 9,600,929 B1 | 3/2017 | Young et al. |
| 9,609,755 B2 | 3/2017 | Coull et al. |
| 9,610,737 B2 | 4/2017 | Johnson et al. |
| 9,611,667 B2 | 4/2017 | GangaRao et al. |
| 9,616,623 B2 | 4/2017 | Johnson et al. |
| 9,626,487 B2 | 4/2017 | Jung et al. |
| 9,626,489 B2 | 4/2017 | Nilsson |
| 9,643,361 B2 | 5/2017 | Liu |
| 9,662,840 B1 | 5/2017 | Buller et al. |
| 9,665,182 B2 | 5/2017 | Send et al. |
| 9,672,389 B1 | 6/2017 | Mosterman et al. |
| 9,672,550 B2 | 6/2017 | Apsley et al. |
| 9,676,145 B2 | 6/2017 | Buller et al. |
| 9,684,919 B2 | 6/2017 | Apsley et al. |
| 9,688,032 B2 | 6/2017 | Kia et al. |
| 9,690,286 B2 | 6/2017 | Hovsepian et al. |
| 9,700,966 B2 | 7/2017 | Kraft et al. |
| 9,703,896 B2 | 7/2017 | Zhang et al. |
| 9,713,903 B2 | 7/2017 | Paschkewitz et al. |
| 9,718,302 B2 | 8/2017 | Young et al. |
| 9,718,434 B2 | 8/2017 | Hector, Jr. et al. |
| 9,724,877 B2 | 8/2017 | Flitsch et al. |
| 9,724,881 B2 | 8/2017 | Johnson et al. |
| 9,725,178 B2 | 8/2017 | Wang |
| 9,731,730 B2 | 8/2017 | Stiles |
| 9,731,773 B2 | 8/2017 | Gami et al. |
| 9,741,954 B2 | 8/2017 | Bruder et al. |
| 9,747,352 B2 | 8/2017 | Karmarkar |
| 9,764,415 B2 | 9/2017 | Seufzer et al. |
| 9,764,520 B2 | 9/2017 | Johnson et al. |
| 9,765,226 B2 | 9/2017 | Dain |
| 9,770,760 B2 | 9/2017 | Liu |
| 9,773,393 B2 | 9/2017 | Velez |
| 9,776,234 B2 | 10/2017 | Schaafhausen et al. |
| 9,782,936 B2 | 10/2017 | Glunz et al. |
| 9,783,324 B2 | 10/2017 | Embler et al. |
| 9,783,977 B2 | 10/2017 | Alqasimi et al. |
| 9,789,548 B2 | 10/2017 | Golshany et al. |
| 9,789,922 B2 | 10/2017 | Dosenbach et al. |
| 9,796,137 B2 | 10/2017 | Zhang et al. |
| 9,802,108 B2 | 10/2017 | Aders |
| 9,809,977 B2 | 11/2017 | Carney et al. |
| 9,817,922 B2 | 11/2017 | Glunz et al. |
| 9,818,071 B2 | 11/2017 | Jung et al. |
| 9,821,339 B2 | 11/2017 | Paschkewitz et al. |
| 9,821,411 B2 | 11/2017 | Buller et al. |
| 9,823,143 B2 | 11/2017 | Twelves, Jr. et al. |
| 9,829,564 B2 | 11/2017 | Bruder et al. |
| 9,846,933 B2 | 12/2017 | Yuksel |
| 9,854,828 B2 | 1/2018 | Langeland |
| 9,858,604 B2 | 1/2018 | Apsley et al. |
| 9,862,833 B2 | 1/2018 | Hasegawa et al. |
| 9,862,834 B2 | 1/2018 | Hasegawa et al. |
| 9,863,885 B2 | 1/2018 | Zaretski et al. |
| 9,870,629 B2 | 1/2018 | Cardno et al. |
| 9,879,981 B1 | 1/2018 | Dehghan Niri et al. |

(56) References Cited

U.S. PATENT DOCUMENTS

| | | |
|---|---|---|
| 9,884,663 B2 | 2/2018 | Czinger et al. |
| 9,898,776 B2 | 2/2018 | Apsley et al. |
| 9,914,150 B2 | 3/2018 | Pettersson et al. |
| 9,919,360 B2 | 3/2018 | Buller et al. |
| 9,931,697 B2 | 4/2018 | Levin et al. |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | TenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |
| 10,268,181 B1 | 4/2019 | Nevins |
| 10,269,225 B2 | 4/2019 | Velez |
| 10,272,860 B2 | 4/2019 | Mohapatra et al. |
| 10,272,862 B2 | 4/2019 | Whitehead |
| 10,275,564 B2 | 4/2019 | Ridgeway et al. |
| 10,279,580 B2 | 5/2019 | Evans et al. |
| 10,285,219 B2 | 5/2019 | Fetfatsidis et al. |
| 10,286,452 B2 | 5/2019 | Buller et al. |
| 10,286,603 B2 | 5/2019 | Buller et al. |
| 10,286,961 B2 | 5/2019 | Hillebrecht et al. |
| 10,289,263 B2 | 5/2019 | Troy et al. |
| 10,289,875 B2 | 5/2019 | Singh et al. |
| 10,291,193 B2 | 5/2019 | Dandu et al. |
| 10,294,552 B2 | 5/2019 | Liu et al. |
| 10,294,982 B2 | 5/2019 | Gabrys et al. |
| 10,295,989 B1 | 5/2019 | Nevins |
| 10,303,159 B2 | 5/2019 | Czinger et al. |
| 10,307,824 B2 | 6/2019 | Kondoh |
| 10,310,197 B1 | 6/2019 | Droz et al. |
| 10,313,651 B2 | 6/2019 | Trevor et al. |
| 10,315,252 B2 | 6/2019 | Mendelsberg et al. |
| 10,336,050 B2 | 7/2019 | Susnjara |
| 10,337,542 B2 | 7/2019 | Hesslewood et al. |
| 10,337,952 B2 | 7/2019 | Bosetti et al. |
| 10,339,266 B2 | 7/2019 | Urick et al. |
| 10,343,330 B2 | 7/2019 | Evans et al. |
| 10,343,331 B2 | 7/2019 | McCall et al. |
| 10,343,355 B2 | 7/2019 | Evans et al. |
| 10,343,724 B2 | 7/2019 | Polewarczyk et al. |
| 10,343,725 B2 | 7/2019 | Martin et al. |
| 10,350,823 B2 | 7/2019 | Rolland et al. |
| 10,356,341 B2 | 7/2019 | Holzer et al. |
| 10,356,395 B2 | 7/2019 | Holzer et al. |
| 10,357,829 B2 | 7/2019 | Spink et al. |
| 10,357,957 B2 | 7/2019 | Buller et al. |

(56) References Cited

U.S. PATENT DOCUMENTS

| | | |
|---|---|---|
| 10,359,756 B2 | 7/2019 | Newell et al. |
| 10,369,629 B2 | 8/2019 | Mendelsberg et al. |
| 10,382,739 B1 | 8/2019 | Rusu et al. |
| 10,384,393 B2 | 8/2019 | Xu et al. |
| 10,384,416 B2 | 8/2019 | Cheung et al. |
| 10,389,410 B2 | 8/2019 | Brooks et al. |
| 10,391,710 B2 | 8/2019 | Mondesir |
| 10,392,097 B2 | 8/2019 | Pham et al. |
| 10,392,131 B2 | 8/2019 | Deck et al. |
| 10,393,315 B2 | 8/2019 | Tyan |
| 10,400,080 B2 | 9/2019 | Ramakrishnan et al. |
| 10,401,832 B2 | 9/2019 | Snyder et al. |
| 10,403,009 B2 | 9/2019 | Mariampillai et al. |
| 10,406,750 B2 | 9/2019 | Barton et al. |
| 10,412,283 B2 | 9/2019 | Send et al. |
| 10,416,095 B2 | 9/2019 | Herbsommer et al. |
| 10,421,496 B2 | 9/2019 | Swayne et al. |
| 10,421,863 B2 | 9/2019 | Hasegawa et al. |
| 10,422,478 B2 | 9/2019 | Leachman et al. |
| 10,425,793 B2 | 9/2019 | Sankaran et al. |
| 10,427,364 B2 | 10/2019 | Alves |
| 10,429,006 B2 | 10/2019 | Tyan et al. |
| 10,434,573 B2 | 10/2019 | Buller et al. |
| 10,435,185 B2 | 10/2019 | Divine et al. |
| 10,435,773 B2 | 10/2019 | Liu et al. |
| 10,436,038 B2 | 10/2019 | Buhler et al. |
| 10,438,407 B2 | 10/2019 | Pavanaskar et al. |
| 10,440,351 B2 | 10/2019 | Holzer et al. |
| 10,442,002 B2 | 10/2019 | Benthien et al. |
| 10,442,003 B2 | 10/2019 | Symeonidis et al. |
| 10,449,696 B2 | 10/2019 | Elgar et al. |
| 10,449,737 B2 | 10/2019 | Johnson et al. |
| 10,461,810 B2 | 10/2019 | Cook et al. |
| 10,781,846 B2 | 9/2020 | Gunner et al. |
| 2006/0108783 A1 | 5/2006 | Ni et al. |
| 2014/0277669 A1 | 9/2014 | Nardi et al. |
| 2017/0113344 A1 | 4/2017 | Schonberg |
| 2017/0341309 A1 | 11/2017 | Piepenbrock et al. |
| 2018/0354205 A1* | 12/2018 | Czinger ............... B29C 65/002 |
| 2019/0061835 A1 | 2/2019 | TenHouten et al. |
| 2019/0070797 A1 | 3/2019 | Helms et al. |
| 2019/0106195 A1 | 4/2019 | Wilkerson |
| 2019/0292821 A1 | 9/2019 | Gunner et al. |
| 2020/0130256 A1* | 4/2020 | Debora ............... B29C 70/745 |

FOREIGN PATENT DOCUMENTS

| | | |
|---|---|---|
| WO | 1996038260 A1 | 12/1996 |
| WO | 2003024641 A1 | 3/2003 |
| WO | 2004108343 A1 | 12/2004 |
| WO | 2005093773 A1 | 10/2005 |
| WO | 2007003375 A1 | 1/2007 |
| WO | 2007110235 A1 | 10/2007 |
| WO | 2007110236 A1 | 10/2007 |
| WO | 2008019847 A1 | 2/2008 |
| WO | 2007128586 A3 | 6/2008 |
| WO | 2008068314 A2 | 6/2008 |
| WO | 2008086994 A1 | 7/2008 |
| WO | 2008087024 A1 | 7/2008 |
| WO | 2008107130 A1 | 9/2008 |
| WO | 2008138503 A1 | 11/2008 |
| WO | 2008145396 A1 | 12/2008 |
| WO | 2009083609 A2 | 7/2009 |
| WO | 2009098285 A1 | 8/2009 |
| WO | 2009112520 A1 | 9/2009 |
| WO | 2009135938 A1 | 11/2009 |
| WO | 2009140977 A1 | 11/2009 |
| WO | 2010125057 A2 | 11/2010 |
| WO | 2010125058 A1 | 11/2010 |
| WO | 2010142703 A2 | 12/2010 |
| WO | 2011032533 A1 | 3/2011 |
| WO | 2014016437 A1 | 1/2014 |
| WO | 2014187720 A1 | 11/2014 |
| WO | 2014195340 A1 | 12/2014 |
| WO | 2015193331 A1 | 12/2015 |
| WO | 2016116414 A1 | 7/2016 |
| WO | 2017036461 A1 | 3/2017 |
| WO | 2019030248 A1 | 2/2019 |
| WO | 2019042504 A1 | 3/2019 |
| WO | 2019048010 A1 | 3/2019 |
| WO | 2019048498 A1 | 3/2019 |
| WO | 2019048680 A1 | 3/2019 |
| WO | 2019048682 A1 | 3/2019 |

OTHER PUBLICATIONS

US 9,809,265 B2, 11/2017, Kinjo (withdrawn)
US 10,449,880 B2, 10/2019, Mizobata et al. (withdrawn)
International Search Report and the Written Opinion issued for corresponding International Application No. PCT/US21/58489, dated Feb. 7, 2022.

* cited by examiner

SYSTEMS AND METHODS FOR FLOATING PIN JOINT DESIGN

CROSS REFERENCE TO RELATED APPLICATION(S)

This application claims the benefit of U.S. Provisional Application Ser. No. 63/130,487, entitled "SYSTEMS AND METHODS FOR FLOATING PIN JOINT DESIGN" and filed on Dec. 24, 2020, the disclosure of which is expressly incorporated by reference herein in its entirety.

BACKGROUND

Field

The present disclosure relates generally to techniques for joining subcomponents, and more specifically to joining nodes and other subcomponents using additively manufactured parts and techniques.

Background

Three-dimensional (3-D) printing, also referred to as additive manufacturing (AM), presents new opportunities to more efficiently build structures, such as automobiles, aircraft, boats, motorcycles, busses, trains and the like. Applying AM processes to industries that produce these products has proven to produce a structurally more efficient transport structure. For example, an automobile produced using 3-D printed components can be made stronger, lighter, and consequently, more fuel efficient. Moreover, AM enables manufacturers to 3-D print parts that are much more complex and that are equipped with more advanced features and capabilities than parts made via traditional machining and casting techniques.

Despite these recent advances, a number of obstacles remain with respect to the practical implementation of AM techniques in transport structures and other mechanized assemblies. For instance, regardless of whether AM is used to produce various components of such devices, manufacturers typically rely on labor-intensive and expensive techniques such as welding, riveting, etc., to join components together, such as nodes used in a transport structure. The deficiencies associated with welding and similar techniques are equally applicable to components, such as a vehicle gear case, that are currently too large to 3-D print in a single AM step. A given 3-D printer is usually limited to rendering objects having a finite size, often dictated by the available surface area of the 3-D printer's build plate and the allowable volume the printer can accommodate. In these instances, manufacturers are often relegated to building the component using the traditional, expensive and time-consuming machining techniques. Alternatively, manufacturers may 3-D print a number of subcomponents and combine them to form a complete, functional component or assembly.

SUMMARY

Several aspects of techniques for joining nodes and subcomponents using an adhesive will be described more fully hereinafter with reference to three-dimensional (3-D) printing techniques.

An apparatus in accordance with an aspect of the present disclosure comprises a 3-D printed first part having an interconnect co-printed with the first part such that the interconnect of the first part can float within the first part, and a 3-D printed second part having an interconnect co-printed with the second part such that the interconnect of the second part can float within the second part, wherein the interconnects of the first and second parts are configured to form a connection between the first and second parts.

Such an apparatus further optionally includes the interconnect of the first part comprising a cup and the interconnect of the second part comprising a cone, an adhesive between the cup and cone, adhesive between the interconnect of the first part and the first part and between the interconnect of the second part and the second part, the interconnect of the first part or the second part comprising a centering feature, and the interconnect of the first part or the second part comprising a locating feature.

A method in accordance with an aspect of the present disclosure comprises 3-D printing a first part to have an interconnect co-printed with the first part such that the interconnect of the first part can float within the first part, 3-D printing a second part to have an interconnect co-printed with the second part such that the interconnect of the second part can float within the second part, and connecting the interconnects of the first and second parts.

Such a method further optionally includes 3-D printing the interconnect of the first part as a cup and 3-D printing the interconnect of the second part as a cone, providing adhesive between the cup and cone, providing adhesive between the interconnect of the first part and the first part and between the interconnect of the second part and the second part, 3-D printing the interconnect of the first or the second part to provide a centering feature, 3-D printing the interconnect of the first or the second part to provide a locating feature, 3-D printing the first part to provide a support region, 3-D printing the first part to include at least one surrogate support across a surface of the support region of the first part, 3-D printing the second part to provide a support region and 3-D printing the second part to include at least one surrogate support across a surface of the support region of the second part, the at least one surrogate support being offset by a gap from the surface of the support region, the gap comprising unsintered powder, the gap comprising at least one of partially sintered powder and fully sintered localized offsets, the gap being uniformly offset from the surface of the support region, and the gap being at least partially non-uniformly offset from the surface of the support region.

A non-transitory computer-readable medium in accordance with an aspect of the present disclosure stores computer executable code for 3-D printing parts, the code when executed by a processor cause the processor to three-dimensionally print a first part having a first interconnect coupled with the first part such that the first interconnect floats within the first part, three-dimensionally print a second part having a second interconnect coupled with the second part such that the second interconnect floats within the second part, and connect the first interconnect and the second interconnect.

It will be understood that other aspects of joining nodes and subcomponents with adhesive will become readily apparent to those skilled in the art from the following detailed description, wherein it is shown and described only several embodiments by way of illustration. As will be appreciated by those skilled in the art, the joining of additively manufactured nodes and subcomponents can be realized with other embodiments without departing from the invention. Accordingly, the drawings and detailed description are to be regarded as illustrative in nature and not as restrictive.

BRIEF DESCRIPTION OF THE DRAWINGS

Various aspects of apparatuses and methods for joining nodes and subcomponents with adhesive will now be presented in the detailed description by way of example, and not by way of limitation, in the accompanying drawings, wherein.

DETAILED DESCRIPTION

Figure 1A:
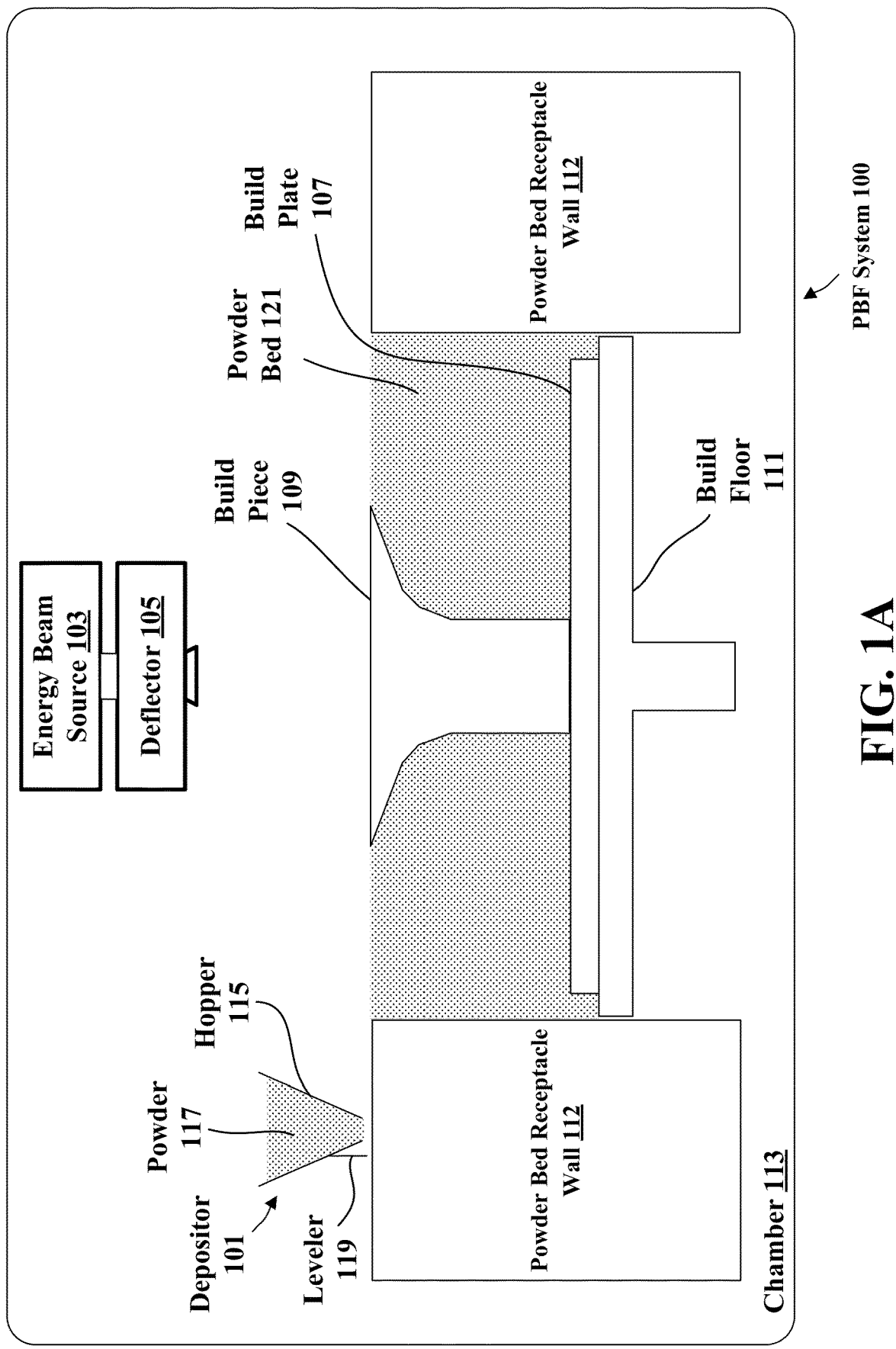
FIGS. 1A-1D illustrate respective side views of a 3-D printer system in accordance with an aspect of the present disclosure.

The detailed description set forth below in connection with the drawings is intended to provide a description of exemplary embodiments of joining additively manufactured nodes and subcomponents, and it is not intended to represent the only embodiments in which the invention may be practiced. The term "exemplary" used throughout this disclosure means "serving as an example, instance, or illustration," and should not necessarily be construed as preferred or advantageous over other embodiments presented in this disclosure. The detailed description includes specific details for the purpose of providing a thorough and complete disclosure that fully conveys the scope of the invention to those skilled in the art. However, the invention may be practiced without these specific details. In some instances, well-known structures and components may be shown in block diagram form, or omitted entirely, in order to avoid obscuring the various concepts presented throughout this disclosure.

The use of additive manufacturing in the context of joining two or more parts provides significant flexibility and cost saving benefits that enable manufacturers of mechanical structures and mechanized assemblies to manufacture parts with complex geometries at a lower cost to the consumer. The joining techniques described in the foregoing relate to a process for connecting AM parts and/or commercial off the shelf (COTS) components. AM parts are printed three-dimensional (3-D) parts that are printed by adding layer upon layer of a material based on a preprogramed design. The parts described in the foregoing may be parts used to assemble a transport structure such as an automobile. However, those skilled in the art will appreciate that the manufactured parts may be used to assemble other complex mechanical products such as vehicles, trucks, trains, motorcycles, boats, aircraft, and the like, and other mechanized assemblies, without departing from the scope of the invention.

In one aspect of the disclosure, a joining technique for additively manufactured nodes is disclosed. A node is an example of an AM part. A node may be any 3-D printed part that includes a socket or other mechanism (e.g., a feature to accept these parts) for accepting a component such as a tube and/or a panel. The node may have internal features configured to accept a particular type of component. Alternatively or conjunctively, the node may be shaped to accept a particular type of component. A node, in some embodiments of this disclosure may have internal features for positioning a component in the node's socket. However, as a person having ordinary skill in the art will appreciate, a node may utilize any feature comprising a variety of geometries to accept any variety of components without departing from the scope of the disclosure. For example, certain nodes may include simple insets, grooves or indentations for accepting other structures, which may be further bound via adhesives, fasteners or other mechanisms.

Nodes as described herein may further include structures for joining tubes, panels, and other components for use in a transport structure or other mechanical assembly. For example, nodes may include joints that may act as an intersecting points for two or more panels, connecting tubes, or other structures. To this end, the nodes may be configured with apertures or insets configured to receive such other structures such that the structures are fit securely at the node. Nodes may join connecting tubes to form a space frame vehicle chassis. Nodes may also be used to join internal or external panels and other structures. In many cases, individual nodes may need to be joined together to accomplish their intended objectives in enabling construction of the above described structures. Various such joining techniques are described below.

FIGS. 1A-D illustrate respective side views of an exemplary 3-D printer system. In this example, the 3-D printer system is a powder-bed fusion (PBF) system 100.

FIGS. 1A-D show PBF system 100 during different stages of operation. The particular embodiment illustrated in FIGS. 1A-D is one of many suitable examples of a PBF system employing principles of this disclosure. It should also be noted that elements of FIGS. 1A-D and the other figures in this disclosure are not necessarily drawn to scale, but may be drawn larger or smaller for the purpose of better illustration of concepts described herein. PBF system 100 can include a depositor 101 that can deposit each layer of metal powder, an energy beam source 103 that can generate an energy beam, a deflector 105 that can apply the energy beam to fuse the powder material, and a build plate 107 that can support one or more build pieces, such as a build piece 109. Although the terms "fuse" and/or "fusing" are used to describe the mechanical coupling of the powder particles, other mechanical actions, e.g., sintering, melting, and/or other electrical, mechanical, electromechanical, electrochemical, and/or chemical coupling methods are envisioned as being within the scope of the present disclosure.

PBF system 100 can also include a build floor 111 positioned within a powder bed receptacle. The walls of the powder bed receptacle 112 generally define the boundaries of the powder bed receptacle, which is sandwiched between the walls 112 from the side and abuts a portion of the build floor 111 below. Build floor 111 can progressively lower build plate 107 so that depositor 101 can deposit a next layer. The entire mechanism may reside in a chamber 113 that can enclose the other components, thereby protecting the equipment, enabling atmospheric and temperature regulation and mitigating contamination risks. Depositor 101 can include a hopper 115 that contains a powder 117, such as a metal powder, and a leveler 119 that can level the top of each layer of deposited powder.

Referring specifically to FIG. 1A, this figure shows PBF system 100 after a slice of build piece 109 has been fused, but before the next layer of powder has been deposited. In fact, FIG. 1A illustrates a time at which PBF system 100 has already deposited and fused slices in multiple layers, e.g., 150 layers, to form the current state of build piece 109, e.g., formed of 150 slices. The multiple layers already deposited have created a powder bed 121, which includes powder that was deposited but not fused.

Figure 1B:
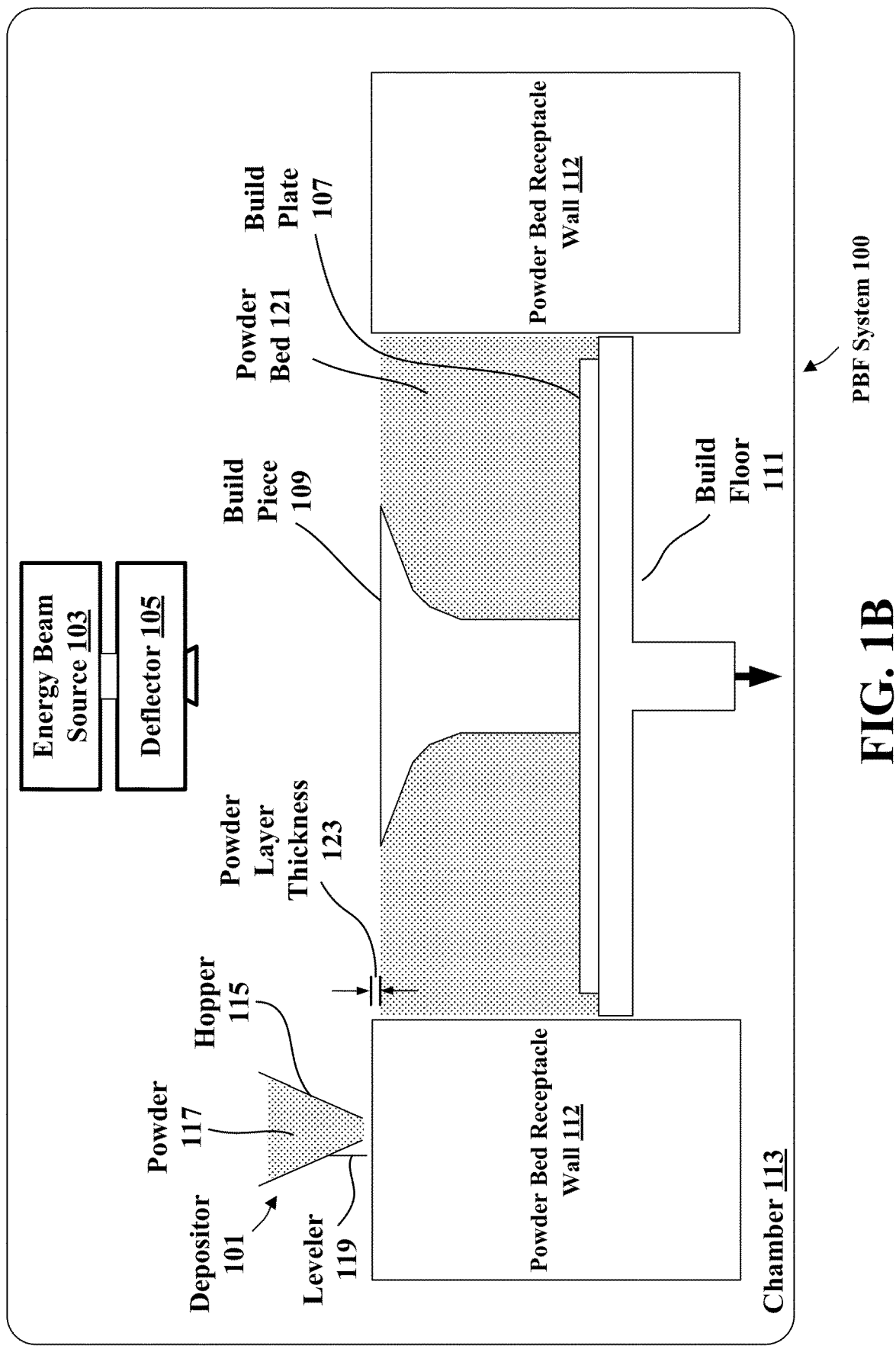

FIG. 1B shows PBF system 100 at a stage in which build floor 111 can lower by a powder layer thickness 123. The lowering of build floor 111 causes build piece 109 and powder bed 121 to drop by powder layer thickness 123, so that the top of the build piece and powder bed are lower than the top of powder bed receptacle wall 112 by an amount equal to the powder layer thickness. In this way, for example, a space with a consistent thickness equal to powder layer thickness 123 can be created over the tops of build piece 109 and powder bed 121.

Figure 1C:
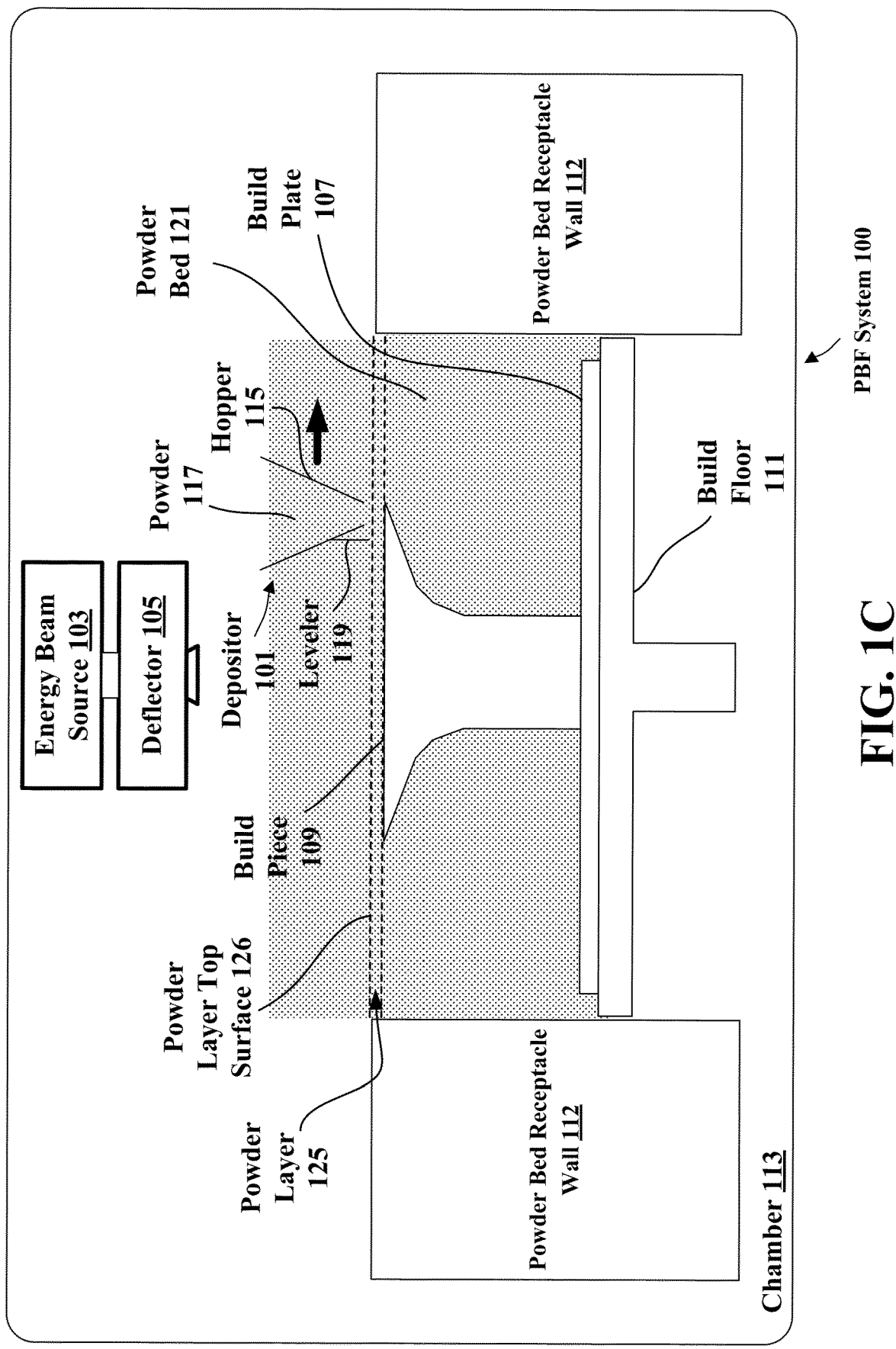

FIG. 1C shows PBF system 100 at a stage in which depositor 101 is positioned to deposit powder 117 in a space created over the top surfaces of build piece 109 and powder bed 121 and bounded by powder bed receptacle walls 112. In this example, depositor 101 progressively moves over the defined space while releasing powder 117 from hopper 115. Leveler 119 can level the released powder to form a powder layer 125 that has a thickness substantially equal to the powder layer thickness 123 (see FIG. 1B). Thus, the powder in a PBF system can be supported by a powder material support structure, which can include, for example, a build plate 107, a build floor 111, a build piece 109, walls 112, and the like. It should be noted that the illustrated thickness of powder layer 125 (i.e., powder layer thickness 123 (FIG. 1B)) is greater than an actual thickness used for the example involving 150 previously-deposited layers discussed above with reference to FIG. 1A.

Figure 1D:
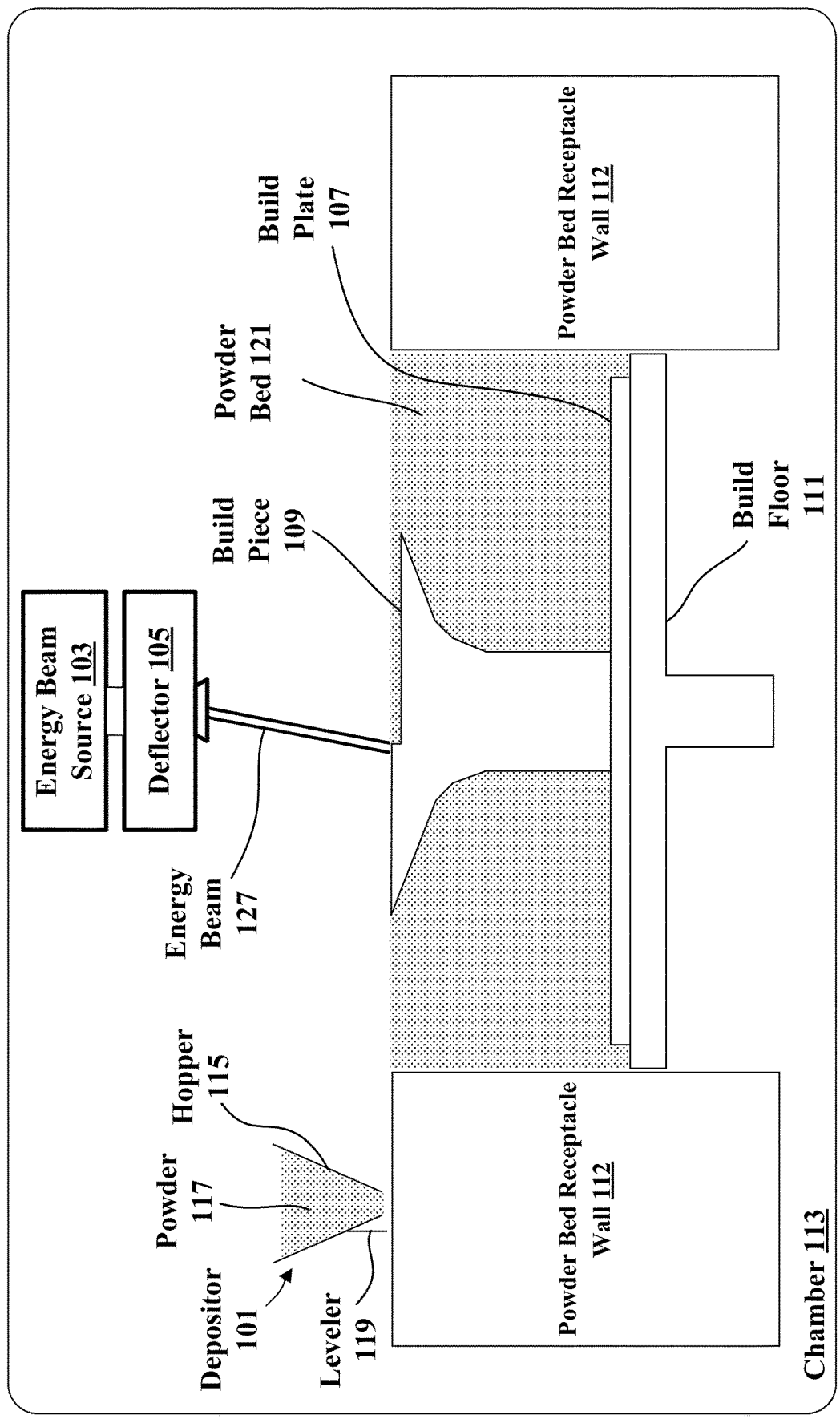

FIG. 1D shows PBF system 100 at a stage in which, following the deposition of powder layer 125 (FIG. 1C), energy beam source 103 generates an energy beam 127 and deflector 105 applies the energy beam to fuse the next slice in build piece 109. In various exemplary embodiments, energy beam source 103 can be an electron beam source, in which case energy beam 127 constitutes an electron beam. Deflector 105 can include deflection plates that can generate an electric field or a magnetic field that selectively deflects the electron beam to cause the electron beam to scan across areas designated to be fused. In various embodiments, energy beam source 103 can be a laser, in which case energy beam 127 is a laser beam. Deflector 105 can include an optical system that uses reflection and/or refraction to manipulate the laser beam to scan selected areas to be fused.

In various embodiments, the deflector 105 can include one or more gimbals and actuators that can rotate and/or translate the energy beam source to position the energy beam. In various embodiments, energy beam source 103 and/or deflector 105 can modulate the energy beam, e.g., turn the energy beam on and off as the deflector scans so that the energy beam is applied only in the appropriate areas of the powder layer. For example, in various embodiments, the energy beam can be modulated by a digital signal processor (DSP).

Figure 1E:
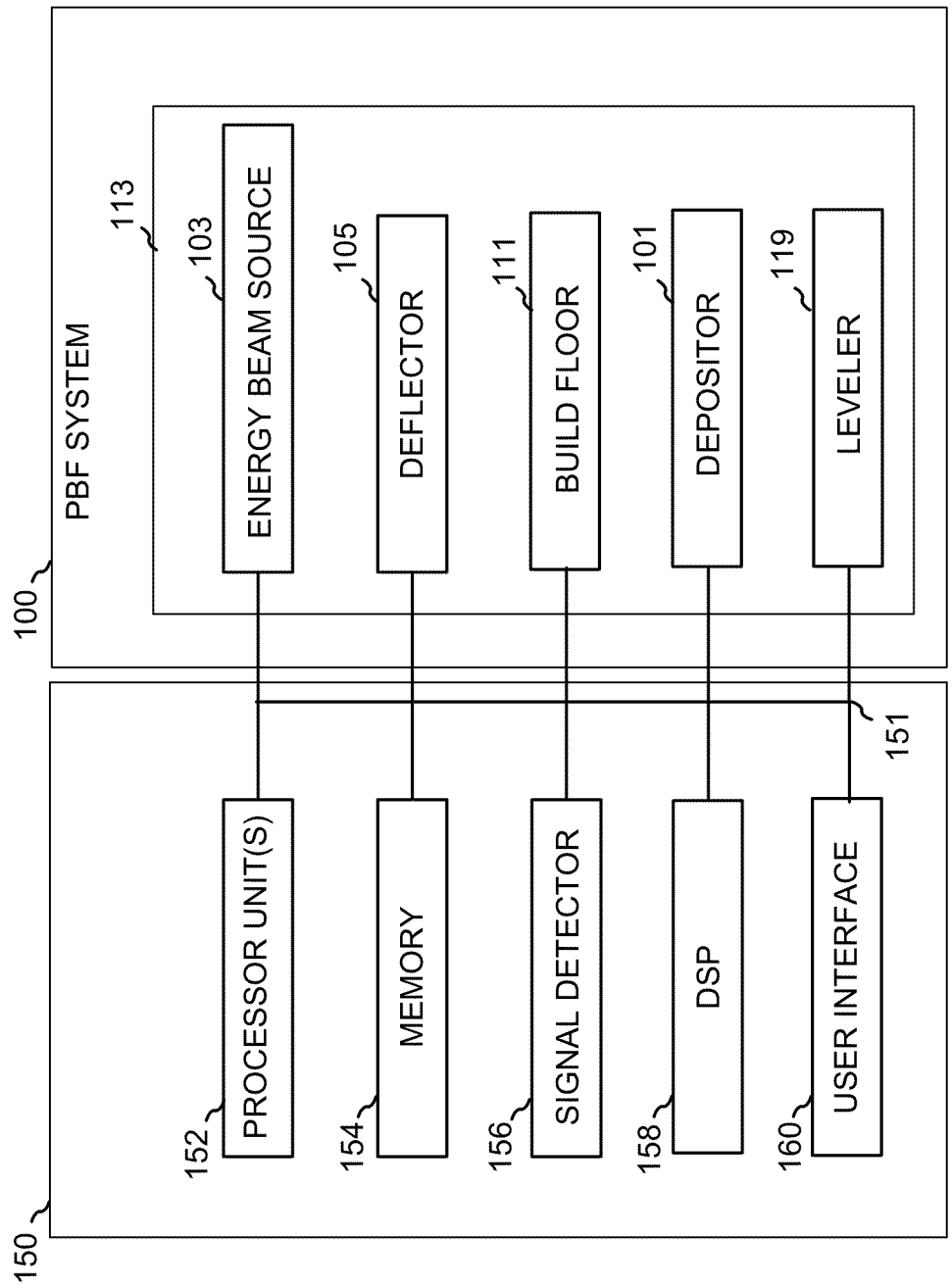
FIG. 1E illustrates a functional block diagram of a 3-D printer system in accordance with an aspect of the present disclosure.

FIG. 1E illustrates a functional block diagram of a 3-D printer system in accordance with an aspect of the present disclosure.

In an aspect of the present disclosure, control devices and/or elements, including computer software, may be coupled to PDF system 100 to control one or more components within PDF system 100. Such a device may be a computer 150, which may include one or more components that may assist in the control of PDF system 100. Computer 150 may communicate with a PDF system 100, and/or other AM systems, via one or more interfaces 151. The computer 150 and/or interface 151 are examples of devices that may be configured to implement the various methods described herein, that may assist in controlling PDF system 100 and/or other AM systems.

In an aspect of the present disclosure, computer 150 may comprise at least one processor unit 152, memory 154, signal detector 156, a digital signal processor (DSP) 158, and one or more user interfaces 160. Computer 150 may include additional components without departing from the scope of the present disclosure.

The computer 150 may include at least one processor unit 152, which may assist in the control and/or operation of PDF system 100. The processor unit 152 may also be referred to as a central processing unit (CPU). Memory 154, which may include both read-only memory (ROM) and random access memory (RAM), may provide instructions and/or data to the processor 504. A portion of the memory 154 may also include non-volatile random access memory (NVRAM). The processor 152 typically performs logical and arithmetic operations based on program instructions stored within the memory 154. The instructions in the memory 154 may be executable (by the processor unit 152, for example) to implement the methods described herein.

The processor unit 152 may comprise or be a component of a processing system implemented with one or more processors. The one or more processors may be implemented with any combination of general-purpose microprocessors, microcontrollers, digital signal processors (DSPs), floating point gate arrays (FPGAs), programmable logic devices (PLDs), controllers, state machines, gated logic, discrete hardware components, dedicated hardware finite state machines, or any other suitable entities that can perform calculations or other manipulations of information.

The processor unit 152 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, RS-274 instructions (G-code), numerical control (NC) programming language, and/or any other suitable format of code). The instructions, when executed by the one or more processors, cause the processing system to perform the various functions described herein.

The computer 150 may also include a signal detector 156 that may be used to detect and quantify any level of signals received by the computer 150 for use by the processing unit 152 and/or other components of the computer 150. The signal detector 156 may detect such signals as energy beam source 103 power, deflector 105 position, build floor 111 height, amount of powder 117 remaining in depositor 101, leveler 119 position, and other signals. The computer 150 may also include a DSP 158 for use in processing signals received by the computer 150. The DSP 158 may be configured to generate instructions and/or packets of instructions for transmission to PDF system 100.

The computer 150 may further comprise a user interface 160 in some aspects. The user interface 160 may comprise a keypad, a pointing device, and/or a display. The user interface 160 may include any element or component that conveys information to a user of the computer 150 and/or receives input from the user.

The various components of the computer 150 may be coupled together by a bus system 151. The bus system 151 may include a data bus, for example, as well as a power bus, a control signal bus, and a status signal bus in addition to the data bus. Components of the computer 150 may be coupled together or accept or provide inputs to each other using some other mechanism.

Although a number of separate components are illustrated in FIG. 1E, one or more of the components may be combined or commonly implemented. For example, the processor unit 152 may be used to implement not only the functionality described above with respect to the processor unit 152, but also to implement the functionality described above with respect to the signal detector 156, the DSP 158, and/or the user interface 160. Further, each of the components illustrated in FIG. 1E may be implemented using a plurality of separate elements.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, compact disc (CD) ROM (CD-ROM) or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, digital versatile disc (DVD), floppy disk and Blu-ray disc where disks usually reproduce data magnetically, while discs reproduce data optically with lasers. Thus, computer readable medium comprises a non-transitory computer readable medium (e.g., tangible media).

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Figure 2:
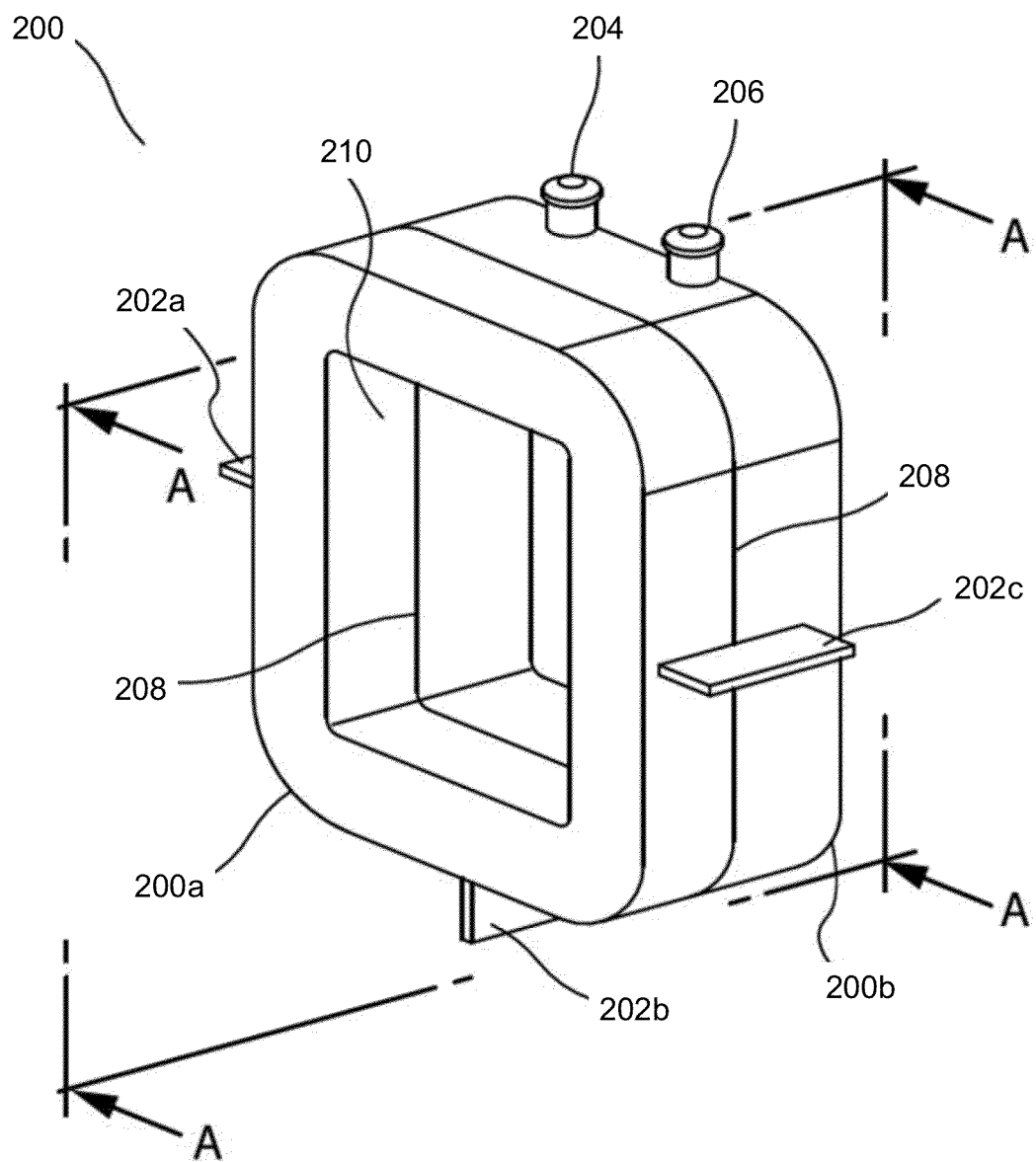
FIG. 2 shows a perspective view illustrating an additively manufactured node-node joint in accordance with an aspect of the present disclosure.

FIG. 2 shows a perspective view illustrating an additively manufactured node-node joint.

In an embodiment, a tongue-and-groove structure is used to connect two or more nodes. FIG. 2 illustrates a perspective view of an additively manufactured node-node joint 200. More specifically, node-node joint sections 200a and 200b are shown joined together at gap 208. Node-node joint 200 further includes standoff tabs 202a-202c arranged around the perimeter of node-node joint 200. In an exemplary embodiment, gap 208 is a 0.25 mm gap (or a gap of another dimension) configured to enable proper spacing of nodes composed of dissimilar metals or other materials. This spacing may ensure that the two subcomponents being joined are not in physical contact so that galvanic corrosion can be avoided. The spacing isolates the nodes/subcomponents. Sealants, in addition to providing seals, may act as spacers as well. In other embodiments lacking corrosion concerns due to the application of coatings or other treatment methods, such as e-coat, on the nodes, the node-node joint sections 200a and 200b may be flush against each other such that no gap is present and not require sealants. Each of node-node joint sections 200a and 200b may include a side wall 210 in the interior of node-node joint 200.

Node to node joint 200 may further include inlet port 204 to enable entry of an adhesive into the node-node joint 200 and vacuum port 206 for drawing a vacuum to facilitate the flow of adhesive within node-node joint 200. In the embodiment shown, respective inlet and vacuum ports 204 and 206 are built within node 200b and designed to provide a flow of adhesive to assist in adjoining nodes 200a and 200b as described below.

Figure 3:
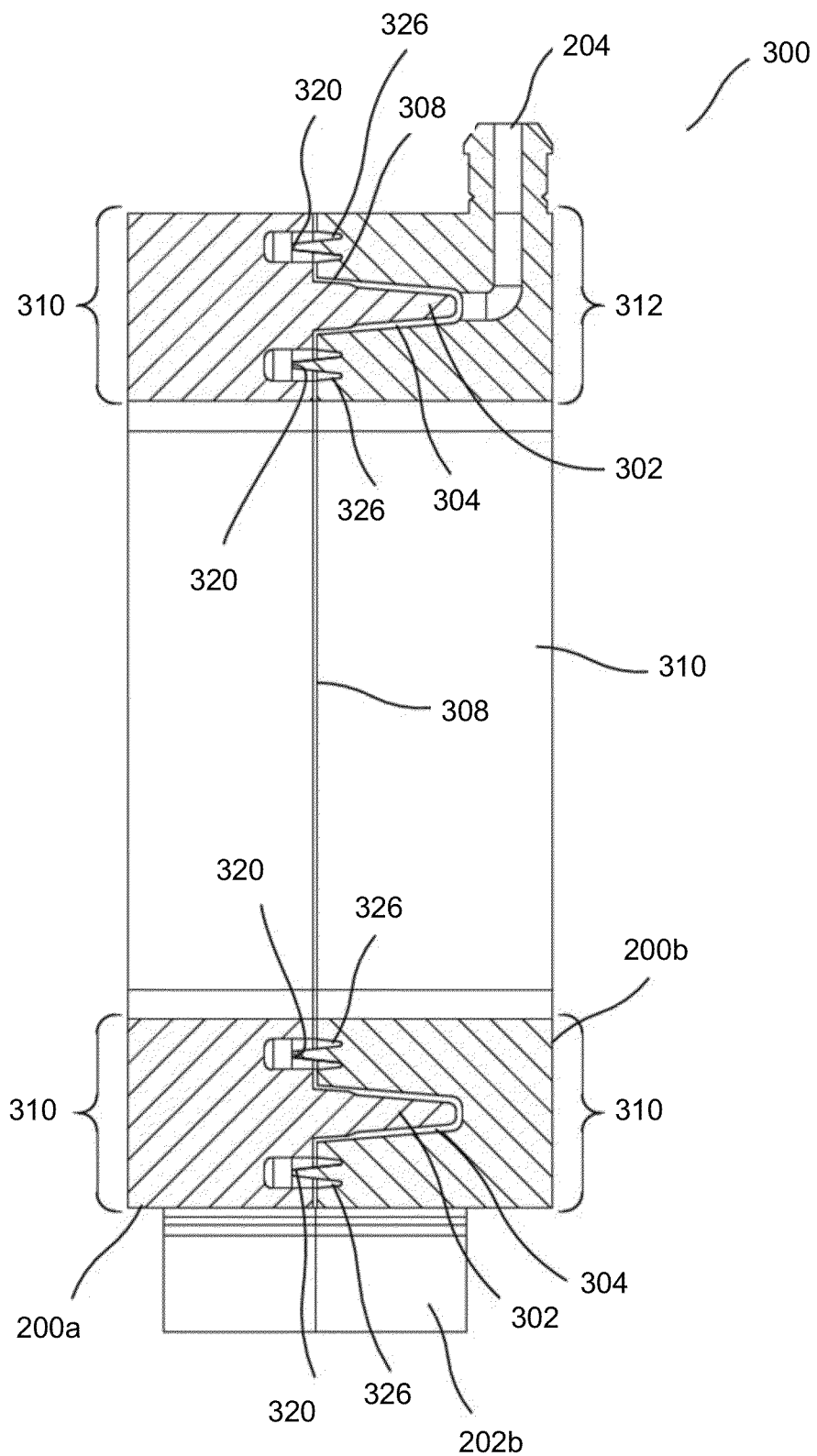
FIG. 3 shows a cross-sectional view illustrating the node-node joint of FIG. 1.

FIG. 3 shows a cross-sectional view illustrating the node-node joint of FIG. 2.

FIG. 3 illustrates a cross-sectional view of the node-node joint 200 taken along plane A-A-A-A. In this view, side wall 210 of FIG. 3 corresponds to side wall 210 of FIG. 2, and standoff tab 202b of FIG. 3 corresponds to standoff tab 202b of FIG. 2. Shown on side wall 210 of FIG. 2 is gap 208. The tongue portion 302 of the node-node joint 300 is part of node 200A, includes a first material represented by the diagonal lines of node 200A, and is disposed along a generally peripheral region 310 of the node 200A. In one embodiment, the tongue portion 302 extends all the way around the peripheral region 310 and is in effect a single protrusion disposed around the peripheral region 310. The tongue portion 302 protrudes outward along the peripheral region 310 relative to node 200B and around node 200A, and the lateral extension of tongue portion 302 can be considered in this view as coming out of the figure. The groove portion 304 of the node-node joint 300 is part of node 200B and is disposed along a generally peripheral region 312 of the node 200b. The groove portion 304 may, but need not, be composed of the material of node 200b, wherein the material is represented by the diagonal lines in node 200b that run in a direction opposite the diagonal lines of node 200a. In one embodiment, the groove portion 304 extends all the way around the peripheral region 312 and is in effect a single indentation in the node 200b all the way around peripheral region 312. The groove portion 302 is inset inward along the peripheral region 312 relative to node 300a and runs laterally around node 300b and can also be considered in this view as coming out of the figure. Tongue 302 and groove 304 may be arranged on respective nodes 200a and 200b such that when the two nodes are properly placed into contact, tongue 302 may align with groove 304 and may fit into groove 304 around the peripheral regions 310, 312.

In an exemplary embodiment, groove 304 includes centering feature 308 which is a narrow region that widens the opening of groove 302 and assists in enabling tongue 302 to properly mate with groove 304 to thereby center the node-node joint 300. In another exemplary embodiment, spill-off sealant reservoirs 326 are provided on each side of the tongue 302, each reservoir 326 having sealant grooves 320 that may be used for the application of an appropriate sealant, e.g., to control the flow of an adhesive to be applied.

As shown relative to FIGS. 2 and 3, adhesive and vacuum ports 204 and 206 are respectively provided. In one embodiment, a sealant is first applied at the sealant grooves 320 of node 200a. The two nodes 200a and 200b may then be aligned and fixed securely in place using standoff tabs 202a-c as alignment points. A vacuum may be applied at vacuum port 206 to ensure that the nodes are sealed. Once a complete seal has been obtained, an adhesive may be applied through inlet port 204. In one embodiment, the internal structure of vacuum port 206 is similar to that of inlet port 204. The adhesive-vacuum action causes the adhesive to seep into the space between the tongue 302 and the groove 304 and to flow in this space around the peripheral region 310, 312 until the adhesive has properly saturated the tongue grove connection around the peripheral region.

In an embodiment, the standoff tabs 220a-c may also be used to assist in preventing sealant pushback during the adhesive flow and curing process. Once the adhesive fills the gap between the tongue 302 and the groove 304 sections substantially completely, the adhesive may be allowed to cure. The vacuum pressure during the adhesive flow process may be monitored and may be indicative of a complete adhesive fill. On completion of the cure, the standoff tabs may in one embodiment be broken off.

Using this technique, nodes can be efficiently and durably combined. The use of AM in one embodiment creates the structure necessary for implementing the joining of the nodes such that additional processes beyond application of an adhesive and/or sealant, such as welding or the use of various external fastening mechanisms, are not necessary.

In another aspect of the disclosure, techniques for joining subcomponents of a larger additively manufactured component, such as an engine, transmission, gear case, etc., are disclosed. In the discussion that follows, the present disclosure will be illustrated in the context of an additively manufactured gear case within the transmission of a transport structure. It will be appreciated, however, that the teachings of the present disclosure are not so limited, and any number and types of additively manufactured components may be assembled using the principles describe herein.

Figure 4:
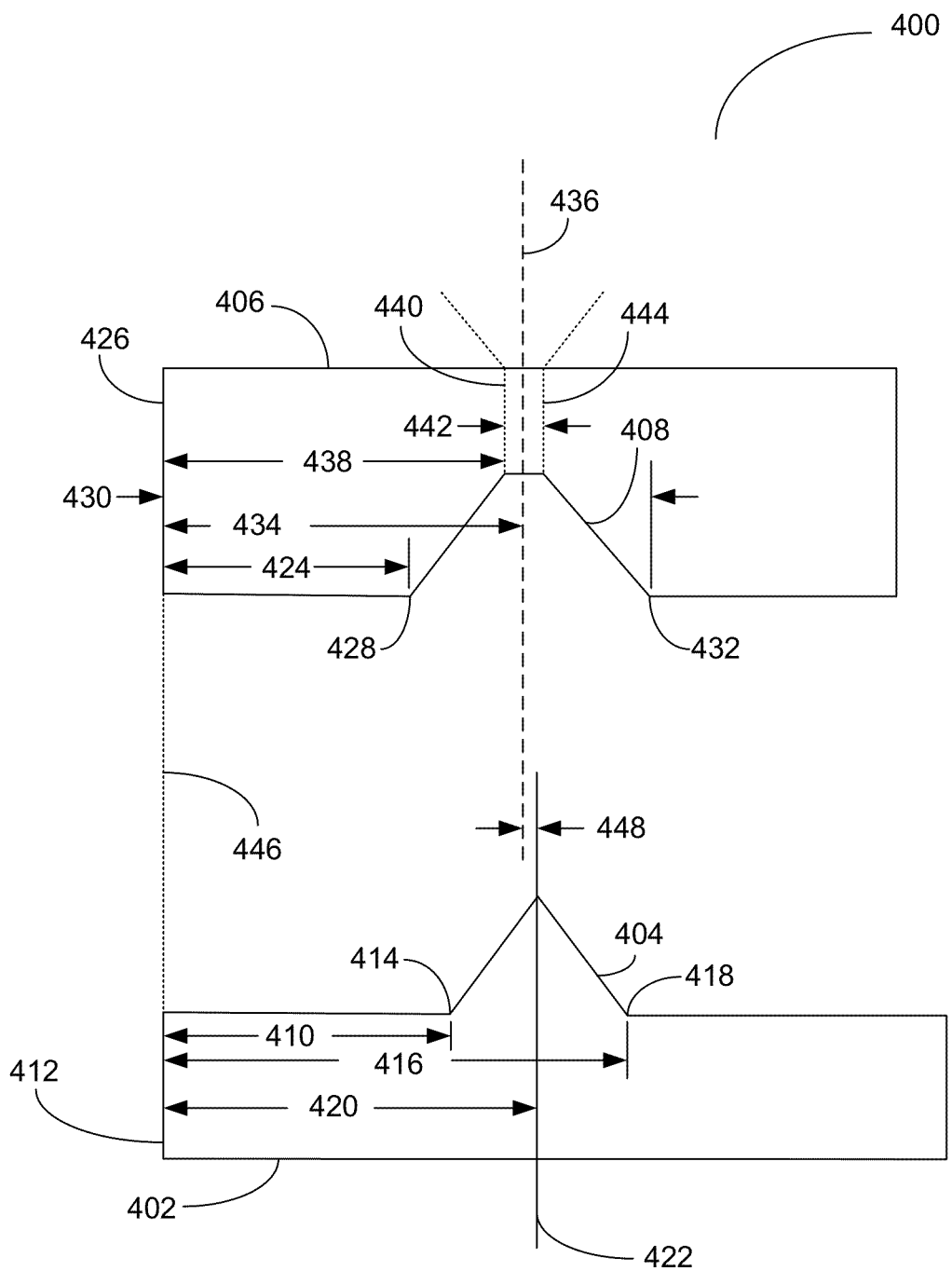
FIG. 4 illustrates a cutaway view of a connection between two parts in an aspect of the present disclosure.

FIG. 4 illustrates a cutaway view of a connection between two parts in an aspect of the present disclosure.

Assembly 400 contains part 402 with registration mark 404, and part 406 with a corresponding registration mark 408. Various measurements, which may be of a nominal nature, are described with respect to part 402 and part 406.

With respect to part 402, distance 410 is the distance between edge 412 and a first edge 414 of registration mark 404. Distance 416 is the distance between edge 412 and a second edge 418 of registration mark 404. Distance 420 is the distance between edge 412 and a center line 422 of registration mark 404.

With respect to part 406, distance 424 is the distance between edge 426 and a first edge 428 of registration mark 408. Distance 430 is the distance between edge 426 and a second edge 432 of registration mark 408. Distance 434 is the distance between edge 426 and a center line 436 of registration mark 408. For part 406, other distances may also be of importance, such as distance 438, the distance between edge 426 and the top edge 440 of registration mark 408, and/or distance 442, the width of the top edge of registration mark 440 between edge 440 and edge 444 of registration mark 408.

As shown in FIG. 4, part 402 and part 406 are designed to be coupled together. Because of the manufacturing tolerances in fabricating part 402 and/or part 406, there are often tolerances in where registration marks 404 and 408 are placed on part 402 and part 406, such that the coupling of part 402 and part 406 can be performed in the desired manner. For example, and not by way of limitation, part 402 and part 406 may be designed such that edge 412 of part 402 and edge 426 of part 406 are to result in a flat surface, i.e., edge 412 and edge 426 are flush with each other, as shown by line 446. In such an example, one design for part 402 would have the center line 422 aligned with the center line 436 of part 406.

However, manufacturing tolerances of part 402 and/or part 406, as well as degradation of the manufacturing process, i.e., tool wear, gear and/or other machine wear, etc., may result in part 402 and/or part 406 deviating from the designed dimensioning values. By properly dimensioning registration mark 404 and/or registration mark 408, an offset of center line 422 from center line 436, shown as offset 448, may take into account the tolerances and/or degradation of the manufacturing process.

However, at some point, a large enough change in one or more of the distances 410, 416, 420, 424, 430, 434, 438, and/or 442 will prevent part 402 and part 406 from coupling while maintaining the flush nature of edge 412 and edge 426. For example, and not by way of limitation, offset 448 may become so large that registration mark 404 no longer completely fits within registration mark 408, e.g., because edge 418 can no longer contact edge 432, the difference between distance 410 and distance 424 is too large, etc. The registration process, e.g., coupling part 402 and part 406, is also exacerbated because part 402 and part 406 may be three-dimensional parts, and FIG. 4 only illustrates two of the dimensions of such a coupling problem addressed by the present disclosure.

Figure 5:
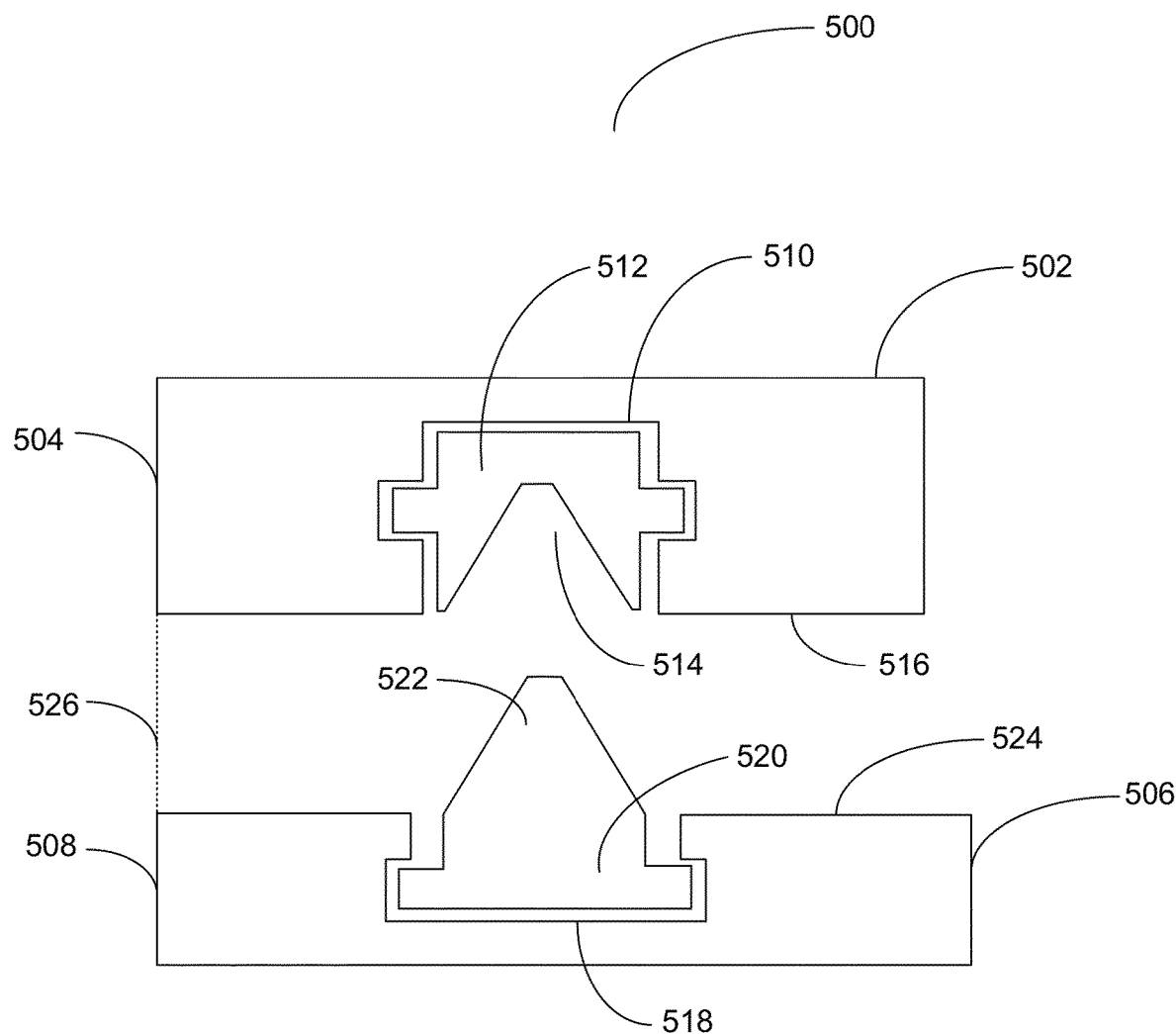
FIG. 5 illustrates a cutaway view of a connection between parts in an aspect of the present disclosure.

FIG. 5 illustrates a cutaway view of a connection between parts in an aspect of the present disclosure.

In an aspect of the present disclosure, assembly 500 illustrates component 502 having surface 504 and component 506 having surface 508. As discussed with respect to FIG. 4, for purposes of example of an aspect of the present disclosure, and not by way of limitation, component 502 and component 506 are to be coupled such that surface 504 is flush with surface 508. Other coupling perspectives, arrangements, and/or approaches are considered to be included in the scope of the present disclosure.

Component 502 also includes cavity 510, where cavity 510 may be adapted to hold one or more connectors 512. Although referred to as a "connector" herein, connector 512 may be referred to as an interconnect, coupler, or other device for coupling component 502 to other components. As shown in FIG. 5, connector 512 may include at least one groove 514. Groove 514 (which may be referred to as a cup, channel, furrow, and or other indentation) may extend into cavity 510 of component 502 as shown in FIG. 5, however, groove 514 may be external to cavity 510, or may be a shape above surface 516 as desired without departing from the scope of the present disclosure. Connector 512 may be co-printed with component 502. In various embodiments, co-printing connector 512 and component 502 may include printing support structures between the connector and the component, in cavity 510. The support structures can be removed after printing to allow connector 512 to "float" in cavity 510 while remaining captive in the cavity. In various embodiments, co-printing may not involve printing support structures. For example, only unfused powder material may be in cavity 510 after printing. In this case, it may only be necessary to remove the powder to allow connector 512 to "float" in cavity 510.

Component 508 also includes cavity 518, where cavity 518 may be adapted to hold one or more connectors 520. Although referred to as a "connector" herein, connector 520 may be referred to as an interconnect, coupler, or other device for coupling component 506 to other components. Connector 520 may include at least one tongue 522. Tongue 522 (which may be referred to as a cone, extrusion, and/or other extension) may extend beyond surface 524 of component 506 as shown in FIG. 5, or tongue 522 may be of any shape as desired without departing from the scope of the present disclosure. Similar to connector 512 and component 502, connector 520 and component 508 may be co-printed. Cavity 518 may include support structures between connector 520 and component 508 after printing, which can be removed to allow connector 520 to "float" in cavity 518. In various cases, connector 520 and component 508 can be co-printed without supports in cavity 518, and only unfused powder needs to be removed.

Connector 512 and connector 520 may be designed to couple together. As an example, the shape of groove 514 and the shape of tongue 522 may be designed such that groove 514 and tongue 522 can connect with each other. In an aspect of the present disclosure, groove 514 and tongue 522 may not be a precise fit, such that a layer of an adhesive, epoxy, resin, other bonding agent, and/or other fluid or gas may be in between groove 514 and tongue 522 when connector 512 and/or connector 520 are mated together.

As shown in FIG. 5, when component 502 and component 506 are coupled, flush line 526 indicates that surface 504 and surface 508 are to be mated as an even, flat surface. Because connector 512 and connector 520 "float" within cavity 510 and cavity 518, the rigidity of connecting points on components 502 and 506 has less of an effect on the ability to couple components 502 and 506 in the desired manner. For example, and not by way of limitation, in FIG. 4, one or more of the distances 410, 416, 420, 424, 430, 434, 438, and/or 442 will prevent part 402 and part 406 from coupling in the desired manner. In an aspect of the present disclosure, the ability of connector 512 and connector 520 to adjust with respect to the flush line 526 reduces the problems of mating components 502 and 506 in the desired manner.

Figure 6:
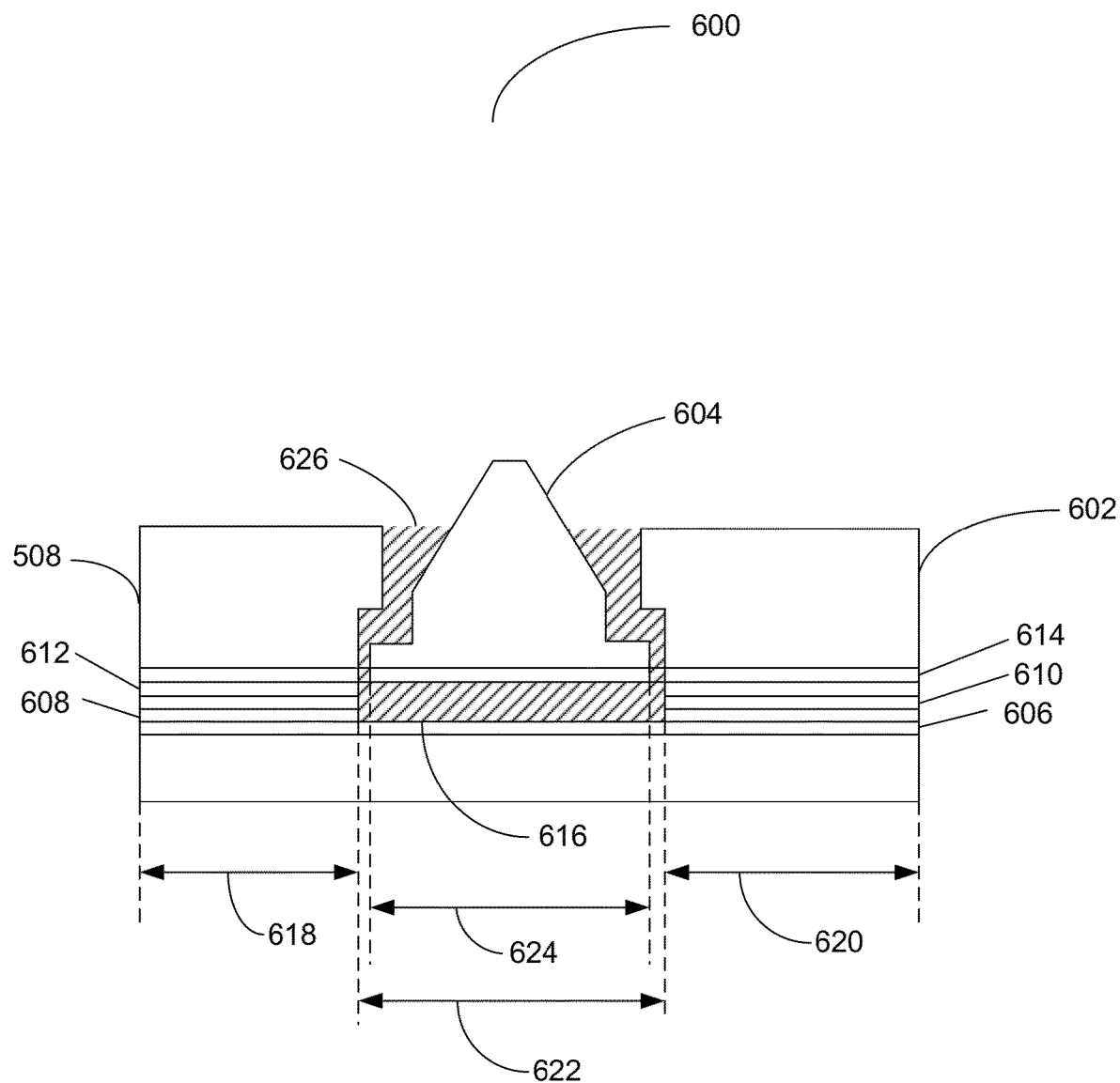
FIG. 6 illustrates a component and connector manufacture in accordance with an aspect of the present disclosure.

FIG. 6 illustrates a component and connector manufacture in accordance with an aspect of the present disclosure.

In an aspect of the present disclosure, an assembly 600 comprising component 602 and connector 604 can be manufactured. As discussed with respect to FIGS. 1A-1D, depositor 101 deposits a layer of powder 117 on a surface, and energy beam source 103 fuses the powder into a solid layer of material. For assembly 600, in an aspect of the present disclosure, assembly 600 may have several layers of material, e.g., layers 606, 608, 610, 612, and 614 as well as many more layers not shown for ease of understanding.

As depositor 101 deposits layer 606, energy beam source 103 may fuse all of the powder 117 into a solid material, which comprises a bottom surface of cavity 616.

Depositor 101 may deposit an entire layer 608 on layer 606, however, energy beam source 103 may only fuse portions of layer 608, shown as portion 618 and portion 620 in FIG. 6, while portion 622 of layer 608 is not fused.

Depositor 101 may then deposit layer 610 on layer 608. Again, energy beam source 103 may only fuse portions of layer 610, e.g., portions 618 and 620, and leave portion 622 of layer 610 unfused. The unfused portion of layer 608 may act as a mechanical support for layer 610 in portion 622.

Depositor 101 may then deposit layer 612 on layer 610. Again, energy beam source 103 may only fuse portions of layer 612, e.g., portions 618 and 620, and leave portion 622 of layer 612 unfused. The unfused portion of layers 608 and 610 may act as a mechanical support for layer 612 in portion 622.

Depositor 101 may then deposit layer 614 on layer 612. Energy beam source 103 may again only fuse portions of layer 612, e.g., portions 618 and 620, and in layer 612, energy beam source 103 may fuse some part of portion 622, shown as portion 624 in FIG. 6. Some portion of layer 614 in portion 622 may remain unfused, or all of portion 614 may be fused as desired. The unfused portion of layers 608, 610, and 612 may act as a mechanical support for layer 614 in portion 622.

As this process of deposition and selective fusing continues for assembly 600, both component 602 and connector 604 may be fabricated. Once the fabrication for assembly is completed, a volume of unfused powder 117, shown as powder 626 in FIG. 6, can be removed from cavity 116. Powder 626 may be removed by vacuuming, shaking, or otherwise dislodging powder 626 from cavity 616, which will leave connector 604 free-floating yet captive within cavity 616.

Other methods of manufacture for component 602 and connector 604 are also contemplated within the scope of the present disclosure. For example, and not by way of limitation, connector 604 can be a "press-fit" or "twist fit" device, such that connector 604 can be installed into cavity 616 with relative ease, but removal of connector 604 may be relatively difficult. Component 602 may be flexible, and bending or otherwise enlarging cavity 616 may allow for insertion of connector 604, and once the bending and/or enlarging of cavity 616 is completed, connector 604 is then captive within cavity 616. A small lead or removable/breakable connection between component 602 and connector 604 can be made during manufacture of assembly 600, and these connections can be mechanically, electrically, electrochemically, and/or otherwise severed to allow connector 604 to free-float within cavity 616. Surrogate support structures may also be used in addition to and/or instead of powder 626. Many alternatives are possible and all such possibilities are considered to be within the scope of the present disclosure.

When component 602 is coupled to another component (as discussed with respect to FIG. 5), that portion of cavity 616 that is not occupied by connector 604 can be filled with adhesives, epoxies, etc. which may stiffen and/or solidify the position of connector 604 within cavity 616 as well as couple component 602 to another component (and connector 604 to another connector). In an aspect of the present disclosure, connector 604, depending on connector 604's shape, may also act as a rough location and/or centering point for component 602. In an aspect of the present disclosure, different shaped connectors 604 on a single component 602 may act as registration marks such that component 602 can only be installed in certain orientations with respect to other components. Many shapes of connectors 602 are possible given the teachings of the present disclosure.

Although shown as approximately centered in cavity 616, connector 604 may be offset within cavity 616, either side-to-side, top-to-bottom, and/or any combination thereof, without departing from the scope of the present disclosure. Cavity 616 provides a support structure for connector 604, such that connector 604 is substantially captive within cavity 616. Gaps and/or spaces between connector 604 and cavity 616 may be filled with unsintered/unfused powder as described above, and/or may include partially sintered/partially fused powder, localized sintered offsets, and uniform and/or non-uniform offset distances between connector 604 and cavity (support structure) 616.

In an aspect of the present disclosure, a floating connector joint design (which may also be called a "floating pin joint design") for connecting additively manufactured parts is disclosed. Connectors in an aspect of the present disclosure may be built into a component and/or recessed into the component; however, the connector may not be physically attached to the part. As such, the connectors can float within the part but not easily be removed. Such connectors can be manufactured separately, or, in an aspect of the present disclosure, the connectors can be made using one or more surrogate support structures.

Since the connectors and/or connection points between components can float in one or more relative planes (relative to the connection between components), the components to be coupled have a floating tolerance. By providing a floating tolerance, the superposition of manufacturing tolerances (known as "tolerance stack-up") may be reduced. Further, any gaps that are desired between connectors and/or components, such as gaps used for adhesive bonding, etc., can also be reduced.

In an aspect of the present disclosure, floating connector joints may allow for larger distortions of one or more components. Depending on the shape of the connectors, the connectors can also serve as rough location and/or centering features for components. Furthermore, the adhesive feature would be designed to ensure that the float is stiffened once the adhesive cures.

A number of different AM technologies may be well-suited and applicable to aspects of the present disclosure. Such 3-D printing techniques may include, for example, selective laser melting (SLM), selective laser sintering (SLS), direct metal laser sintering (DMLS), electron beam melting (EBM) and other AM processes involving melting or fusion of metallic powders. As in other 3-D printing techniques, SLM, SLS and other powder-bed fusion ("PBF") systems, create build pieces layer-by-layer. Each layer or 'slice' is formed by depositing a layer of powder and exposing portions of the powder to an energy beam. The energy beam is applied to melt areas of the powder layer that coincide with the cross-section of the build piece in the layer. The melted powder cools and fuses to form a slice of the build piece. The process can be repeated to form the next slice of the build piece, and so on. Each layer is deposited on top of the previous layer. The resulting structure is a build piece assembled slice-by-slice from the ground up. SLS and various other PBF techniques may be well suited to construction of gear cases and other transport structure components. However, it will be appreciated that other AM techniques, such as fused deposition modeling (FDM) and the like, are also possible for use in such applications.

Figure 7:
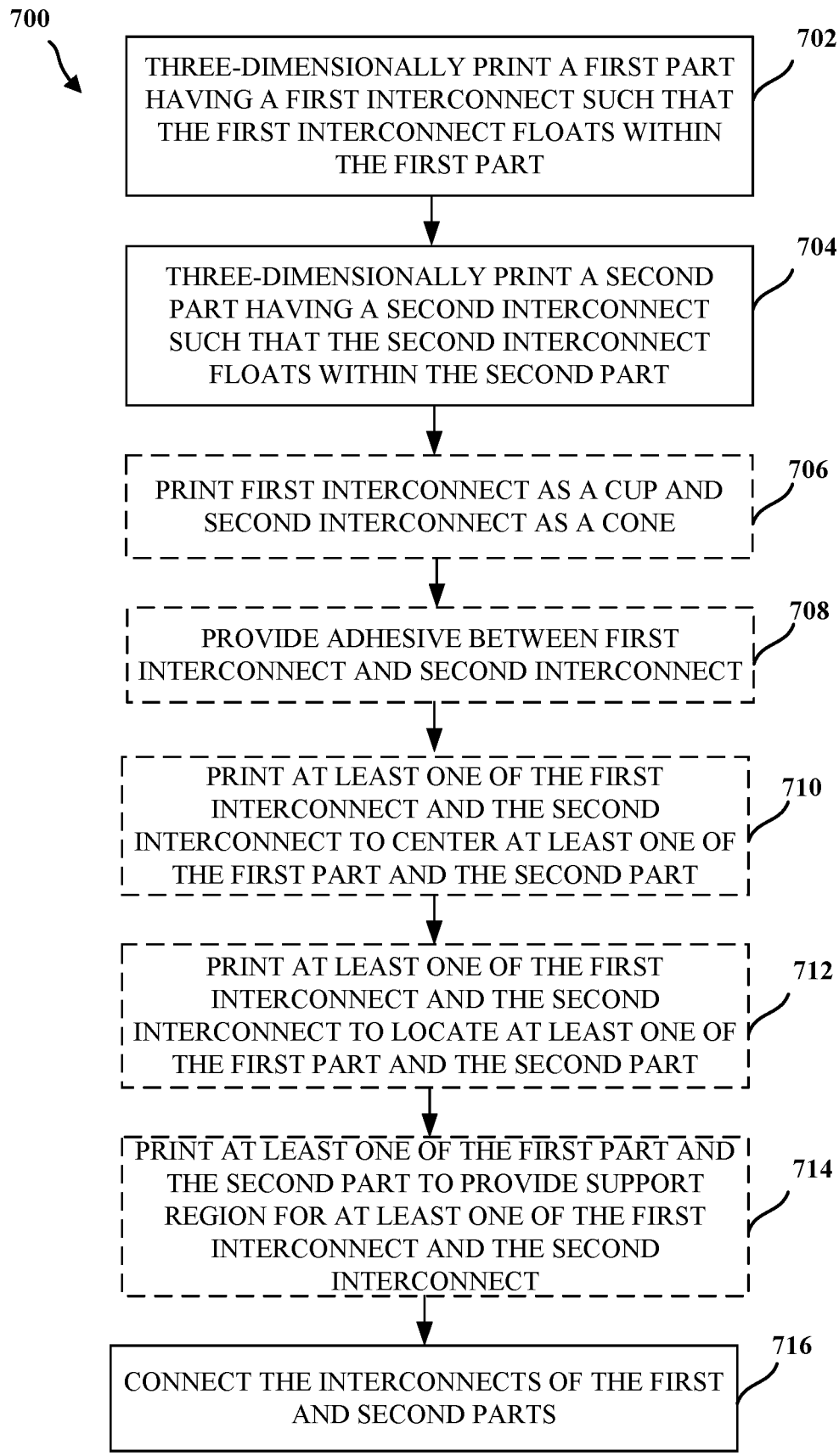
FIG. 7 shows a flow diagram illustrating an exemplary method for additively manufacturing a component in accordance with an aspect of the present disclosure.

FIG. 7 shows a flow diagram 700 illustrating an exemplary method for additively manufacturing a component in accordance with an aspect of the present disclosure.

It should be understood that the steps identified in FIG. 7 are exemplary in nature, and a different order or sequence of steps, and additional or alternative steps, may be undertaken as contemplated in this disclosure to arrive at a similar result.

At step 702, a first part may be 3-D printed and/or otherwise additively manufactured to have a first interconnect coupled with the first part, such that the first interconnect floats within the first part. The first interconnect may be co-printed with the first part, or may be printed separately and captively coupled with the first part.

At step 704, a second part may be 3-D printed and/or otherwise additively manufactured to have a second interconnect coupled with the second part, such that the second interconnect floats within the second part. The second interconnect may be co-printed with the second part, or may be printed separately and captively coupled with the second part.

Optional step 706 indicates that the first interconnect may be printed as a cup and that second interconnect may be printed as a cone.

Optional step 708 provides an adhesive between the first interconnect and the second interconnect, which may optionally be the cup and the cone of step 706.

Optional step 710 prints at least one of the first interconnect and the second interconnect to center at least one of the first part and the second part.

Optional step 712 prints at least one of the first interconnect and the second interconnect to locate at least one of the first part and the second part.

Optional step 714 prints at least one of the first part and the second part to provide a support region for at least one of the first interconnect and the second interconnect. The support region may be a surrogate support, which may be offset by a gap, and the gap may comprise unsintered powder, partially sintered powder, partially non-uniformly offset from the surface of the support region, and/or sintered localized offsets from the surface of the support region.

At step 716, the interconnects of the first and second parts are coupled and/or connected. The coupling/connection process may be accomplished using a variety of techniques, e.g., a sealant may be applied between respective areas of the interconnects which may contain the flow of an adhesive, to facilitate a strong vacuum, to reduce galvanic corrosion, and/or to assist in securing the two components.

The previous description is provided to enable any person skilled in the art to practice the various aspects described herein. Various modifications to these exemplary embodiments presented throughout this disclosure will be readily apparent to those skilled in the art, and the concepts disclosed herein may be applied to other techniques for printing and joining nodes and subcomponents. Thus, the claims are not intended to be limited to the exemplary embodiments presented throughout the disclosure, but are to be accorded the full scope consistent with the language claims. All structural and functional equivalents to the elements of the exemplary embodiments described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. An apparatus, comprising:
    a 3-D printed first part having a surface and an interconnect co-printed with the first part such that the interconnect of the first part can float within the first part;
    a 3-D printed second part having a surface and an interconnect co-printed with the second part such that the interconnect of the second part can float within the second part;
    wherein the interconnects of the first and second parts are configured to form a flush connection between the surfaces of the first and second parts.

2. The apparatus of claim 1, wherein the interconnect of the first part comprises a cup and the interconnect of the second part comprises a cone.

3. The apparatus of claim 2, further comprising adhesive between the cup and the cone.

4. The apparatus of claim 1, further comprising adhesive:
    between the interconnect of the first part and the first part; and
    between the interconnect of the second part and the second part.

5. The apparatus of claim 1, wherein the interconnect of the first part or the second part comprises a centering feature.

6. The apparatus of claim 1, wherein the interconnect of the first part or the second part comprises a locating feature.

7. The apparatus of claim 1, wherein the interconnects of the first and second parts are connected.

8. The apparatus of claim 5, wherein the centering feature is a region that widens an opening of the interconnect of the first part or the second part and is configured to couple the interconnect of the first part to the interconnect of the second part.

* * * * *